United States Patent
Hiraoka et al.

[11] Patent Number: 6,008,639
[45] Date of Patent: Dec. 28, 1999

[54] MAGNETIC SENSOR HAVING A MAIN ELECTRICAL CIRCUIT BASE WITH A CRACK FORMING AREA

[75] Inventors: Naoki Hiraoka; Hiroshi Sakanoue; Noriaki Hayashi; Wataru Fukui; Yutaka Ohashi, all of Tokyo, Japan

[73] Assignee: Mitsubishi Denki Kabushiki Kaisha, Tokyo, Japan

[21] Appl. No.: 08/927,264

[22] Filed: Sep. 11, 1997

[30] Foreign Application Priority Data

Mar. 5, 1997 [JP] Japan .................................. 9-050551

[51] Int. Cl.$^6$ .......................... G01P 3/488; G01R 33/06; H05K 1/00
[52] U.S. Cl. ...................... 324/174; 174/254; 324/207.2; 361/749
[58] Field of Search ..................... 324/173, 174, 324/207.2, 207.21, 207.25, 207.26; 174/52.1–52.3, 59, 254, 255; 29/595; 361/749

[56] References Cited

U.S. PATENT DOCUMENTS

| | | | |
|---|---|---|---|
| 5,008,496 | 4/1991 | Schmidt et al. | 174/254 |
| 5,031,026 | 7/1991 | Ueda | 361/749 X |
| 5,266,746 | 11/1993 | Nishihara | 174/254 |
| 5,422,568 | 6/1995 | Hashizume et al. | 324/174 X |
| 5,631,556 | 5/1997 | Shibata | 324/174 |
| 5,631,557 | 5/1997 | Davidson | 324/174 |
| 5,637,995 | 6/1997 | Izawa et al. | 324/174 |

FOREIGN PATENT DOCUMENTS

| | | |
|---|---|---|
| 4014885 A1 | 5/1990 | Germany . |
| 195 23 322 A1 | 6/1995 | Germany . |
| 07198736 | 8/1995 | Japan . |
| 08219709 | 8/1996 | Japan . |

*Primary Examiner*—Gerard Strecker
*Attorney, Agent, or Firm*—Sughrue, Mion, Zinn, Macpeak & Seas PLLC

[57] ABSTRACT

A magnetic sensor whose electronic components will never become fatally damaged as the result of an external force. In this magnetic sensor, electronic components located near a connector are connected to a base and disposed in such a manner that the longitudinal axis of those electronic components are substantially perpendicular to the longitudinal axis of the base. A crack generating region is formed between the connector electronic component disposed near the connector. The crack generating region yields application of an external force on the base.

10 Claims, 6 Drawing Sheets

MAGNETIC SENSOR HAVING A MAIN ELECTRICAL CIRCUIT BASE WITH A CRACK FORMING AREA

BACKGROUND OF THE INVENTION

1. Field of the Invention

The present invention relates to a magnetic sensor, for example, for detecting the speed of revolution of a gear-shaped magnetic rotor.

2. Description of the Related Art

FIG. 7 is a side view of a conventional magnetic sensor, and FIG. 8 is a sectional side view of the magnetic sensor shown in FIG. 7. This magnetic sensor includes a main portion 1 of the sensor and a connector 2 connected to the main portion 1.

The main portion 1 of the sensor includes: a cylindrical case 3 made of a synthetic resin; a main electric circuit 4 placed in the case 3; a rectangular-shaped permanent magnet 5 disposed at an end of the main electric circuit 4; a Hall element 6 serving as a magnetoelectric device disposed in front of the permanent magnet 5; and an O-ring 7 for sealing the connection between the main portion 1 of the sensor and the connector 2.

The main electric circuit 4 includes: a base 8 made of a resin; a plurality of electronic components 9 each encapsulated in its own ceramic package and mounted on the base 8; and interconnecting lines 10 for making electric connections among the electronic components 9.

FIG. 9 is a plan view of an insert 11 from which the interconnecting lines 10 and terminals 17 of the connector 2 will be formed. The insert 11 includes: an interconnecting material 12; a terminal material (not shown); a dual-structure land 14 having a bent portion 13 located at its end; and ties 15.

The main electric circuit 4 may be produced as follows. First, insert molding is performed with the insert 11 so as to form the base 8. The ties 15 are then cut off thereby forming the interconnecting lines 10 from the interconnecting material 12 and also forming the terminals 17 from the terminal material. Then, the respective electronic components 9 are bonded, by means of soldering, to the corresponding lands 14 which serve as their electrodes. Thus, the main electric circuit 4 is obtained. In the above structure, the bent portion 13 of each land 14 is bent in such a manner that the bent portion 13 becomes higher in position than the surface of each interconnecting line 10 and terminal 17 so that molten solder is prevented from flowing outside the land 14 due to interfacial tension.

In the above magnetic sensor, when the gear-shaped magnetic rotor 16, which is made of a magnetic material and disposed near the magnetic sensor, is rotated, the recessed portions 16a and the protruding portions 16b of the magnetic rotor 16 alternately approach and pass by the Hall element 6. This creates a corresponding change in the magnetic field which is applied to the Hall element 6 after emerging from the permanent magnet 5. The above change in the magnetic field is detected as a change in voltage by the Hall element 6. The change in voltage generated by the Hall element 6 is amplified and converted to a pulse signal by the electronic components 9. The resultant electric signal in pulse form is transmitted to a computer unit (not shown) via the terminal 17 so as to detect the speed of revolution of the magnetic rotor 16.

In the conventional magnetic sensor described above, when the main electric circuit 4 is put into the case 3 in the production process, a great force can be accidentally exerted on the end portion of the main electric circuit 4 as shown in FIG. 10(b). Such a force can bend the main electric circuit 4 along its axis A. As a result, a great amount of bending moment occurs at the connector-side end portion of the base 8, and a crack 18 can occur across the base 8 at the connector-side end portion as shown in FIG. 10(a). Those electronic components 9A located on the crack 18 can be damaged (For example, chip breakage), which can result in a fatal failure.

Thus, it is a general object of the present invention to solve the above problem. More specifically, it is an object of the present invention to provide a magnetic sensor whose electric components will never become fatally damaged as the result of an external force.

SUMMARY OF THE INVENTION

According to an aspect of the invention, there is provided a magnetic sensor in which electronic components located near a connector are disposed in such a manner that the longitudinal axis of these electronic components are substantially perpendicular to the longitudinal axis of a base.

Preferably, the base has a crack generating area formed between the connector and an electronic component nearest to the connector so that when the main electric circuit is bent along its longitudinal axis by an external force exerted on the main electric circuit, if the external force is large enough to create a crack, then the crack occurs in the crack generating area.

The above crack generating area may be formed by introducing a cut-away portion.

The crack generating area may also be formed by means of introducing a thin area whose thickness is smaller than that of the opposite end portion of the base.

DESCRIPTION OF THE PREFERRED EMBODIMENTS

First Embodiment

Figure 1:
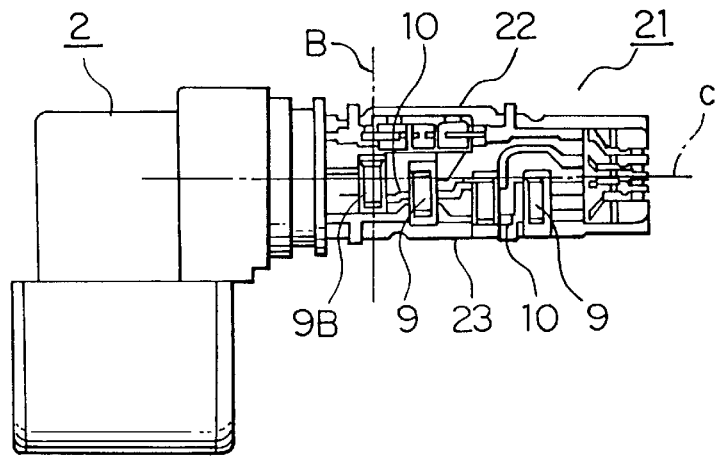
FIG. 1 is a plan view of a magnetic sensor according to a first embodiment of the invention (in which its case is not shown)
Figure 2:
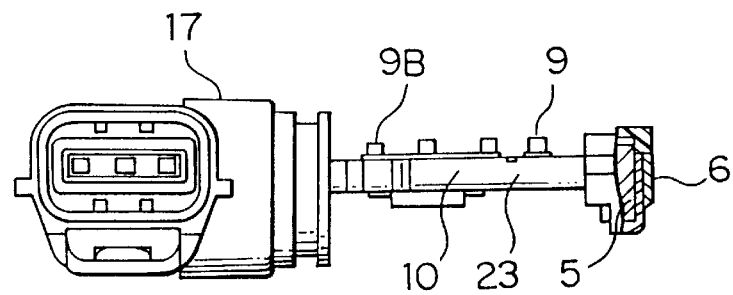
FIG. 2 is a side view of the magnetic sensor shown in FIG. 1.

FIG. 1 is a plan view illustrating a magnetic sensor according to a first embodiment of the invention (in which its case is not shown). FIG. 2 is a side view of the magnetic sensor shown in FIG. 1. In these figures, parts similar to those in FIGS. 7 to 10 are denoted by similar reference numerals, and are not described in further detail.

The magnetic sensor of this embodiment includes a main portion 21 of the sensor, and a connector 2 connected to the main portion 21.

The main portion 21 of the sensor includes: a cylindrical case 3 made up of a synthetic resin; a main electric circuit 22 placed in the case 3; a rectangular-shaped permanent magnet 5 disposed at an end of the main electric circuit 22; and a Hall element 6 serving as a magnetoelectric device disposed in front of the permanent magnet 5.

The main electric circuit 22 includes: a base 23 made of a resin; a plurality of electronic components 9 mounted on the base 23; and interconnecting lines 10 for making electric connections among the electronic components 9. Regarding the electronic components 9, those components 9B located near the connector 2 are disposed in such a manner that the longitudinal axis B of each component 9B is perpendicular to the longitudinal axis C of the base 23.

Figure 3:
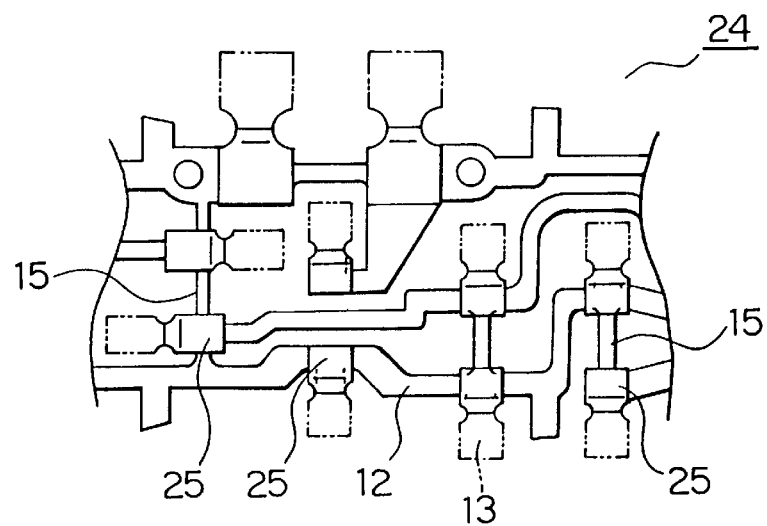
FIG. 3 is a fragmentary plan view of an insert serving as a material for forming interconnecting lines and terminals in the magnetic sensor shown in FIG. 1.

FIG. 3 is a fragmentary plan view of an insert 24 from which the interconnecting lines 10 and terminals 17 of the connector 2 will be formed. The insert 24 includes: an interconnecting material 12; terminal materials (not shown); a dual-structure land 25 having a bent portion 13 located at its end; and ties 15.

Figure 4A:
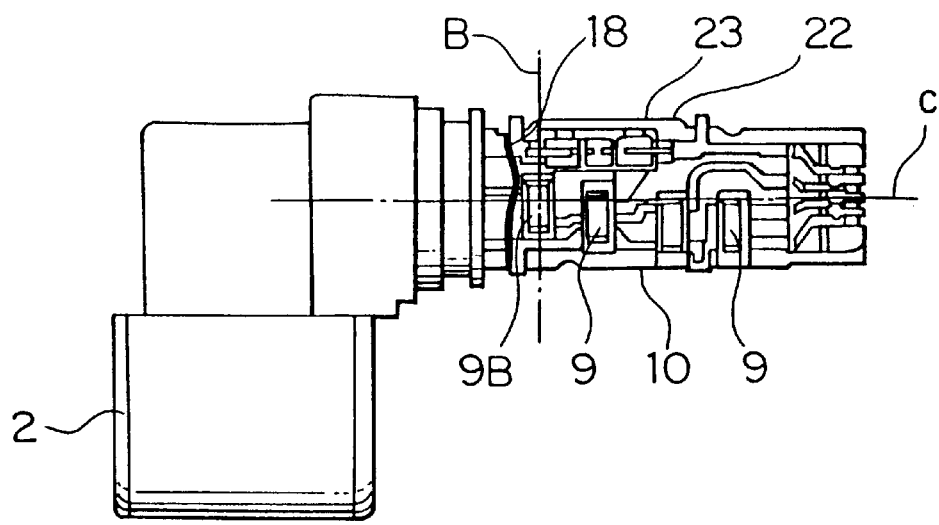
FIG. 4(a) is a plan view illustrating a crack produced in the magnetic sensor shown in FIG. 1.
Figure 4B:
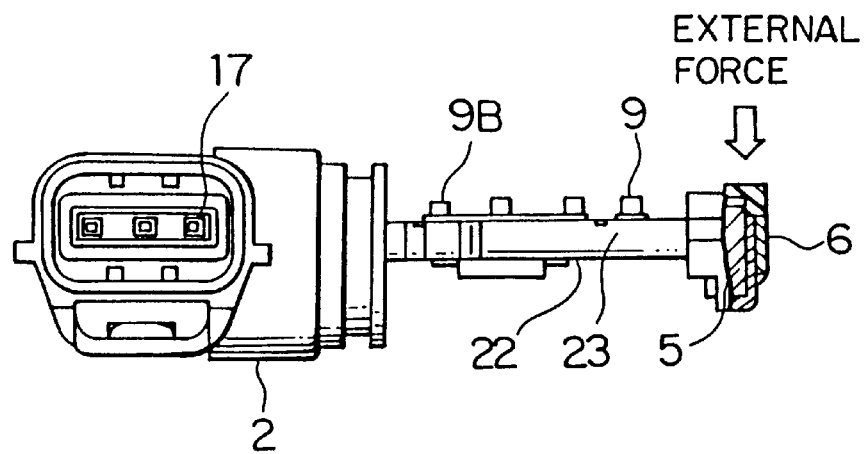
FIG. 4(b) is a side view of FIG. 4(a)

In the magnetic sensor of the present embodiment, if a great force is accidentally exerted on the end portion of the main electric circuit 22 as shown in FIG. 4(b) when the main electric circuit 22 is put into the case 3 during the production process, a large amount of bending moment occurs at the connector-side end portion of the base 23, and a crack 18 can occure across the base 23 at the connector-side end portion as shown in FIG. 4(a). Although there are also electronic components 9B disposed in the region near the end of the base 23, since these electronic components 9B are disposed such that the longitudinal axis B of each component is perpendicular to the longitudinal axis C of the base 23, there is little chance that the crack 18 will pass through any of the electronic components 9B. This correspondingly reduces the probability that the electronic components 9B will encounter damage (such as chip breakage) due to the crack 18.

Although it is possible for the crack 18 to pass through some of the electronic components 9B, in such a case electronic components 9B would be deformed along the shorter axis. Thus the amount of deformation would be smaller than that which may potentially occur along the longitudinal axis of the electronic components 9A in the conventional magnetic sensor. Therefore, the bending stress exerted on the electronic components 9B is smaller than that exerted on the electronic components 9A in the conventional magnetic sensor and the electronic components 9B are not broken easily.

In this invention, it is not necessarily required that the electronic components 9B be disposed such that the longitudinal axis B of the electronic components 9B are exactly perpendicular to the longitudinal axis C of the base 23, but the orientation of the longitudinal axis B of the electronic components 9B may be set within a certain range as long as it can be regarded as substantially perpendicular to the longitudinal axis C of the base. For example, the longitudinal axis B of the electronic components 9B has an angle of 75° with respect to the longitudinal axis C of the base.

Second Embodiment

Figure 5A:
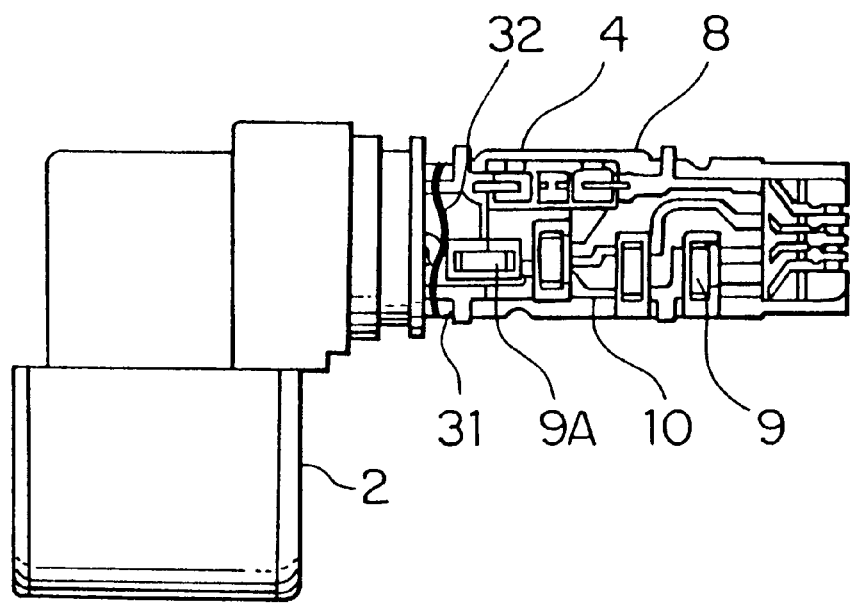
FIG. 5(a) is a plan view of a magnetic sensor according to a second embodiment of the invention (in which its case is not shown)
Figure 5B:
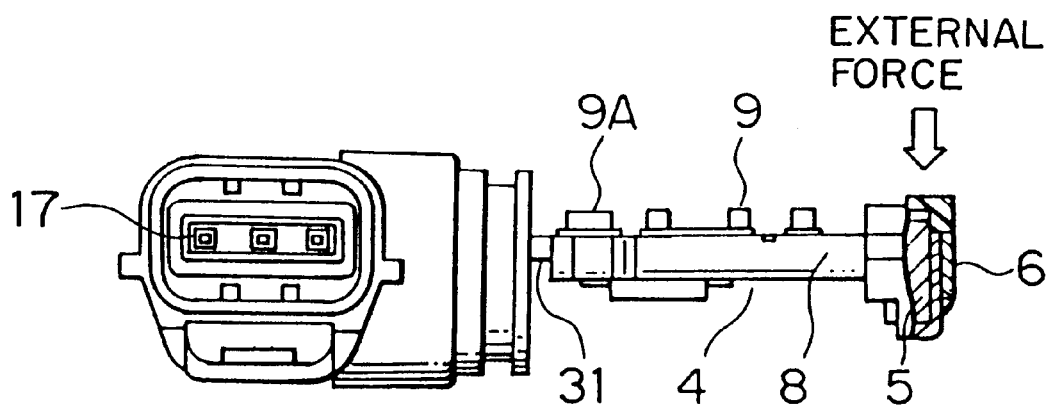
FIG. 5(b) is a side view of FIG. 5(a)

FIG. 5(a) is a plan view illustrating a magnetic sensor according to a second embodiment of the invention (in which its case is not shown) FIG. 5(b) is a side view of the magnetic sensor shown in FIG. 5(a). In this second embodiment, the base 8 has a cut-away portion 31 serving as a crack generating area formed between the connector 2 of the magnetic sensor and the electronic component 9A located nearest to the connector 2.

In this embodiment, when the main electric circuit 4 is bent along its longitudinal axis by an external force exerted on the main electric circuit 4 as shown in FIG. 5(b), if the external force is large enough to create a crack in the base 8, then, as shown in FIG. 5(a), a crack 32 is produced in the cutaway portion 31 which is the physically weakest portion in the main electric circuit 4. This prevents the electronic components 9A on the base 8 from becoming fatally damage (such as by chip breakage).

Third Embodiment

Figure 6A:
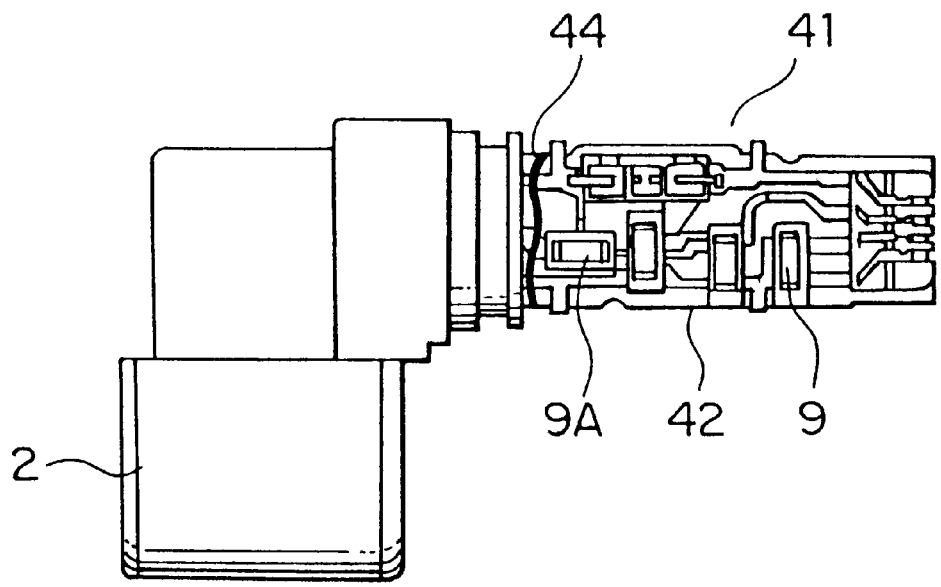
FIG. 6(a) is a plan view of a magnetic sensor according to a third embodiment of the invention (in which its case is not shown)
Figure 6B:
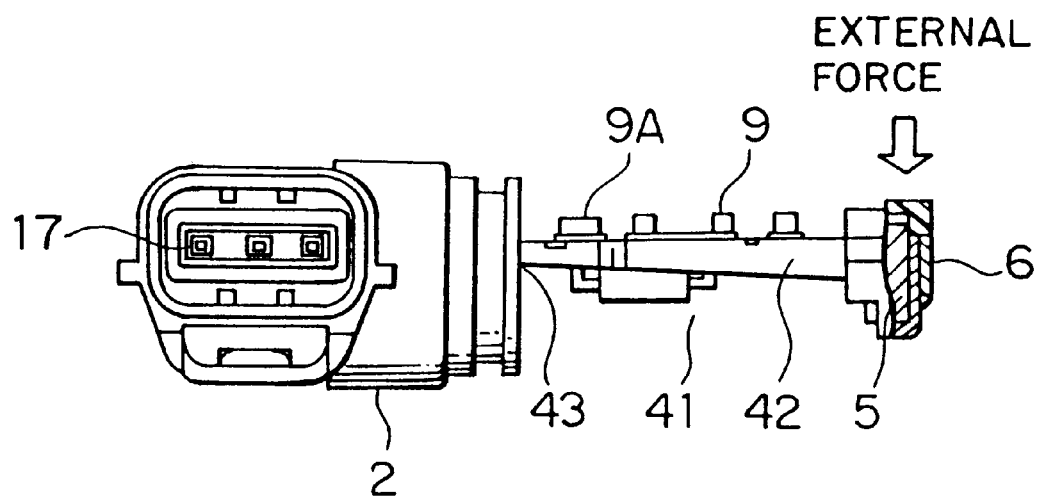
FIG. 6(b) is a side view of FIG. 6(a)
Figure 7:
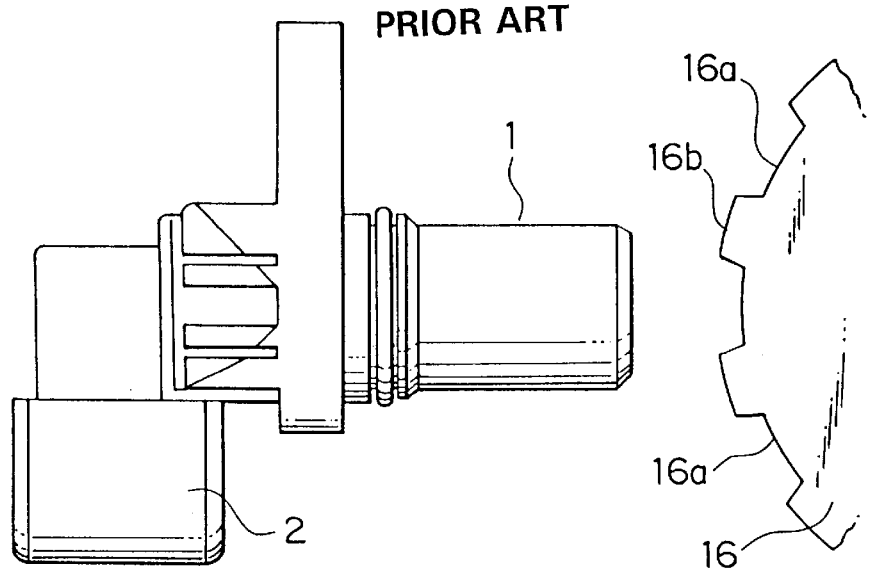
FIG. 7 is a side view illustrating a conventional magnetic sensor.
Figure 8:
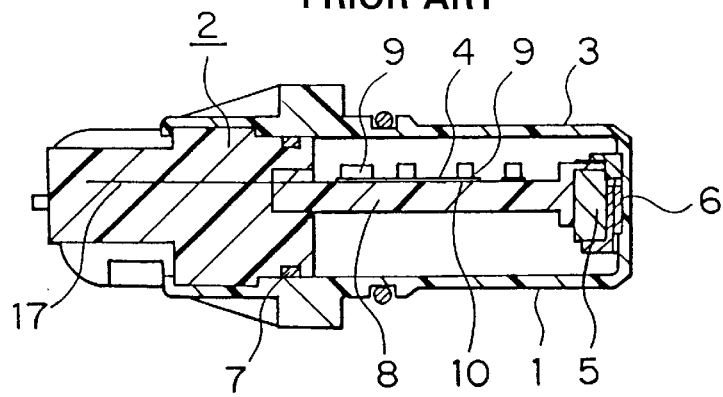
FIG. 8 is a sectional side view of the magnetic sensor shown in FIG. 7.
Figure 9:
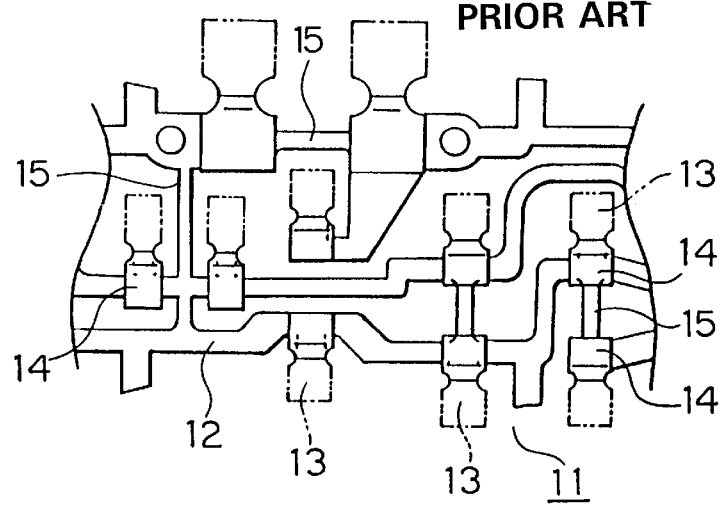
FIG. 9 is a fragmentary plan view of an insert serving as a material for forming interconnecting lines and terminals in the magnetic sensor shown in FIG. 7.
Figure 10A:
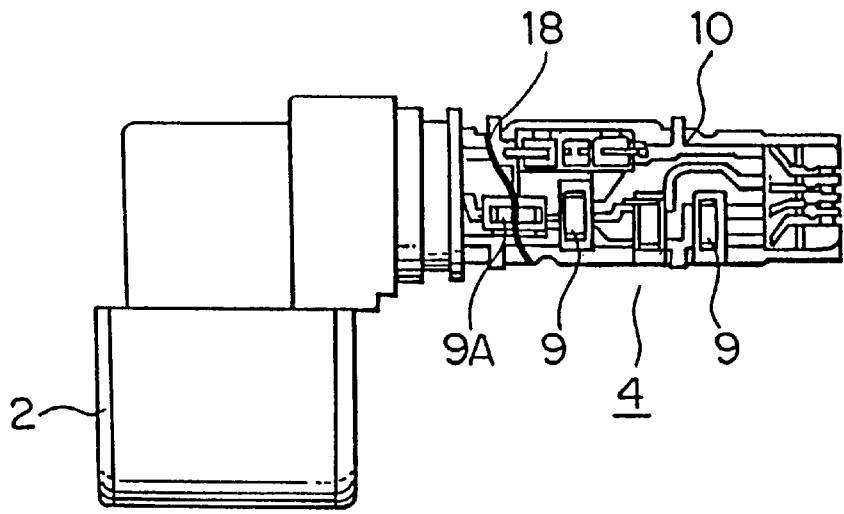
FIG. 10(a) is a plan view illustrating a crack produced in the magnetic sensor shown in FIG. 7.
Figure 10B:
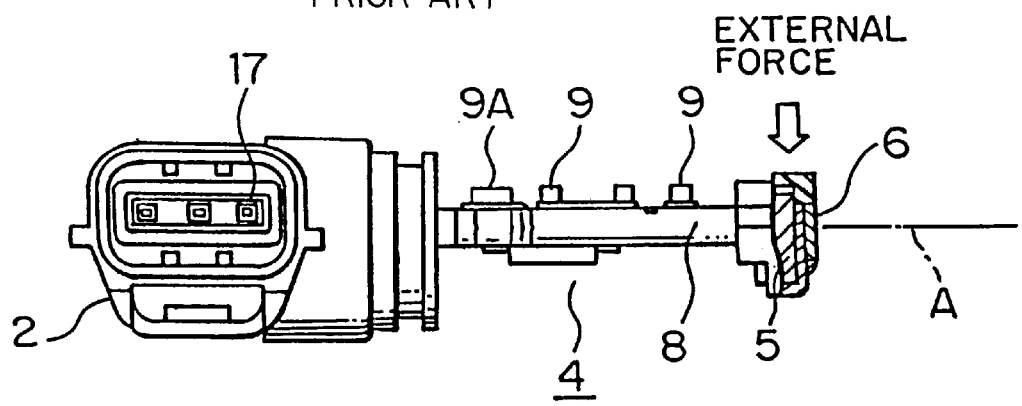
FIG. 10(b) is a side view of FIG. 10(a).

FIG. 6(a) is a plan view illustrating a magnetic sensor according to a third embodiment of the invention (in which its case is not shown). FIG. 6(b) is a side view of the magnetic sensor shown in FIG. 6(a). In this third embodiment, the thickness of the base 42 of the main electric circuit 41 decreases toward the connector 2, and a thin portion 43 serving as a crack generating area is formed at a connector-side end of the base 42 wherein the thickness of the thin portion 43 is smaller than the thickness of the opposite end portion of the base 42.

In this embodiment, when the main electric circuit 41 is bent along its longitudinal axis by an external force exerted on the main electric circuit 41 as shown in FIG. 6(b), if the external force is large enough to create a crack in the base 42, then, as shown in FIG. 6(a), a crack 44 is produced in the thin portion 43 which is the physically weakest portion in the main electric circuit 41. This prevents the electronic components 9A on the base 42 from becoming fatally damaged (such as by chip breakage).

Although in the above embodiments the crack generating area is realized in the form of the cut-away portion or the thin portion, the crack generating area is not limited to these. For example, the crack generating area may also be realized by forming a plurality of small holes in the end region of the base in such a manner that the holes are located along the shorter axis of the base and they are spaced aportion from each other.

The above-described first embodiment, in which electronic components near the connector are disposed such that the longitudinal axis of those electronic components is perpendicular to the longitudinal axis of the base, is combined with the second or third embodiment in which the crack generating area is provided thereby ensuring, to a greater degree, that the electronic components do not become damaged due to a crack on the base.

In the present invention, as described above, the electronic components, located in an area near the connector where a crack is often produced due to an external force applied to the main electric circuit, are prevented from being damaged by the crack passing through the electronic components by means of disposing those electronic components such that their longitudinal axis is substantially perpendicular to the longitudinal axis of the base. This reduces the possibility that the crack would pass through any electronic components thereby reducing the possibility that the electronic components would become damaged by the crack.

This allows a great reduction in the probability that the electronic components encounter fatal damage due to a crack occuring in the base. Although it is possible for the crack to pass through some electronic components, in such a case the electronic components will be deformed along their shorter axis and thus no great bending stress is exerted on the electronic components. Therefore, the electronic components are not broken easily.

Furthermore, in the present invention, the crack generating area is formed between the connector and the electronic component located nearest to the connector so that when an external force applied to the main electric circuit is large enough to create a crack in the base, the crack occurs in the crack generating area thereby preventing the electronic components on the base from becoming fatally damaged.

In the case where the crack generating area is created as a cut-away portion, the cut-away portion may be formed easily at the same time the base is formed by means of insert molding.

When the crack generating area is realized as a thin portion whose thickness is smaller than the thickness of the opposite end portion of the base, the thin portion may also be formed easily, in the same manner as the cut-away portion, at the same time the base is formed.

We claim:

1. A magnetic sensor comprising:
   a main electric circuit comprising a base, a plurality of electronic components disposed on said base, and interconnecting lines for making an electric connection of said electronic components;
   a connector connected to a first longitudinal end of said main electric circuit;
   a magnet for generating a magnetic field, said magnet being disposed at a second longitudinal end of said main electric circuit, said magnetic field being generated by said magnet and rotation of a magnetic rotor having a varying edge configuration and located adjacent to the second longitudinal end of said main electric circuit; and
   a magnetoelectric device for detecting a change in the magnetic field due to rotation of said magnetic rotor as a change in voltage to provide a magnetic sensing function, said magnetoelectric device being disposed adjacent to said magnet and said magnetic rotor;
   wherein electronic components located near said connector are disposed such that the longitudinal axis of said electronic components are substantially perpendicular to the longitudinal axis of said base, wherein said base includes a crack generating area at a location between said connector and one of said plurality of electronic components which is located nearest to said connector so that when said main electric circuit is bent along its longitudinal direction by an external force exerted on said main electric circuit, if said external force is larger enough to create a crack in said base, then the crack occurs in said crack generating area.

2. A magnetic sensor comprising:
   a main electric circuit comprising a base, a plurality of electronic components disposed on said base, and interconnecting lines for making an electric connection of said electronic components;
   a connector connected to a first longitudinal end of said main electric circuit;
   a magnet for generating a magnetic field, said magnet being disposed at a second longitudinal end of said main electric circuit, said magnetic field being generated by said magnet and rotation of a magnetic rotor having a varying edge configuration and located adjacent to the second longitudinal end of said main electric circuit; and
   a magnetoelectric device for detecting a change in the magnetic field due to rotation of said magnetic rotor as a change in voltage to provide a magnetic sensing function, said magnetoelectric device being disposed adjacent to said magnet and magnetic rotor;
   wherein a crack generating area is formed in said base, at a location between said connector and one of said plurality of electronic components which is located nearest to said connector so that when said main electric circuit is bent along its longitudinal direction by an external force exerted on said main electric circuit, if said external force is large enough to create a crack in said base, then the crack occurs in said crack generating area.

3. A magnetic sensor according to claim 2, wherein said crack generating area is a cut-away portion.

4. A magnetic sensor according to claim 2, wherein said crack generating area is a thin portion near said first longitudinal end having a thickness which is smaller than the thickness of the base at said second longitudinal end.

5. A magnetic sensor comprising:
   a main electric circuit comprising a base, a plurality of electronic components disposed on said base, and interconnecting lines for making an electric connection of said electronic components;
   a connector connected to a first longitudinal end of said main electric circuit;
   a magnet for generating a magnetic field, said magnet being disposed at a second longitudinal end of said main electric circuit, said magnetic field being generated by said magnet and rotation of a magnetic rotor having a varying edge configuration and located adjacent to the second longitudinal end of said main electric circuit; and
   a magnetoelectric device for detecting a change in the magnetic field due to rotation of said magnetic rotor as a change in voltage to provide a magnetic sensing function, said magnetoelectric device being disposed adjacent to said magnet and magnetic rotor;
   wherein said base includes a crack generating area formed between said connector and one of said plurality of electronic components which is located nearest said connector, said crack generating area yielding to absorb an external force imposed on said base during manufacturing of said magnetic sensor.

6. A magnetic sensor according to claim 5, wherein said crack generating area is a cut-away portion.

7. A magnetic sensor according to claim 5, wherein said crack generating area is a thin portion near said first longitudinal end whose thickness is smaller than the thickness of the base at said second longitudinal end.

8. A magnetic sensor according to claim 1, wherein said base is substantially rigid.

9. A magnetic sensor according to claim 2, wherein said base is substantially rigid.

10. A magnetic sensor according to claim 5, wherein said base is substantially rigid.

* * * * *